United States Patent [19]
Florus

[11] Patent Number: 5,542,810
[45] Date of Patent: Aug. 6, 1996

[54] EASILY REMOVABLE DUAL PURPOSE APPARATUS FOR SAFELY TRANSPORTING PERSONAL WATERCRAFT IN TRUCK BED

[76] Inventor: H. Cameron Florus, 4563 Iroquois Ave., Lakewood, Calif. 90713

[21] Appl. No.: 420,322

[22] Filed: Apr. 11, 1995

Related U.S. Application Data

[63] Continuation of Ser. No. 251,775, May 31, 1994, abandoned.

[51] Int. Cl.⁶ ................................................. B656 67/02
[52] U.S. Cl. .................... 414/538; 280/414.1; 414/462
[58] Field of Search ................................. 414/462, 537, 414/538, 498, 500, 559; 280/414.1; 224/43.32, 42.33

[56] References Cited

U.S. PATENT DOCUMENTS

| | | | |
|---|---|---|---|
| 1,640,263 | 8/1927 | Burgett | 414/498 X |
| 2,880,893 | 4/1959 | Johnson | 414/537 |
| 3,337,171 | 8/1967 | Canning | 280/414.1 X |
| 3,455,473 | 7/1969 | Parker | 214/84 |
| 3,550,800 | 12/1970 | Robinson | 214/450 |
| 4,212,580 | 7/1980 | Fluck | 414/522 |
| 4,274,788 | 6/1981 | Sutton | 414/538 X |
| 4,507,016 | 3/1985 | Honour VII | 280/414.1 X |
| 4,801,152 | 1/1989 | Elliott et al. | 280/414.1 X |
| 4,960,356 | 10/1990 | Wrenn | 414/462 |
| 5,005,846 | 4/1991 | Taylor | 280/30 |
| 5,090,335 | 2/1992 | Russell | 414/537 X |
| 5,184,913 | 2/1993 | Meriwether | 405/1 |
| 5,184,914 | 2/1993 | Basta | 405/3 |
| 5,195,767 | 3/1993 | Des Roches | 280/414.1 |
| 5,232,329 | 8/1993 | Livingston | 414/462 X |
| 5,249,910 | 10/1993 | Ball | 414/538 |
| 5,257,728 | 11/1993 | Gibson | 224/42.45 |
| 5,281,075 | 1/1994 | Tatman et al. | 414/538 |

FOREIGN PATENT DOCUMENTS 120689  12/1945  Australia ........................... 414/538

Primary Examiner—David A. Bucci

[57] ABSTRACT

A rack for personal watercraft which is designed for easy loading and unloading via a ramp, and for easy installation by simply setting the rack in the truck bed and attaching tie downs (7) or other strapping material. The rack requires no modification of the truck. The rack serves a dual role as a dolly or stationary storage device. The rack includes a number of safety features-one of which provides redundant barriers between the truck driver and the watercraft. The rack can accomodate deep hulled or modified watercraft.

4 Claims, 11 Drawing Sheets

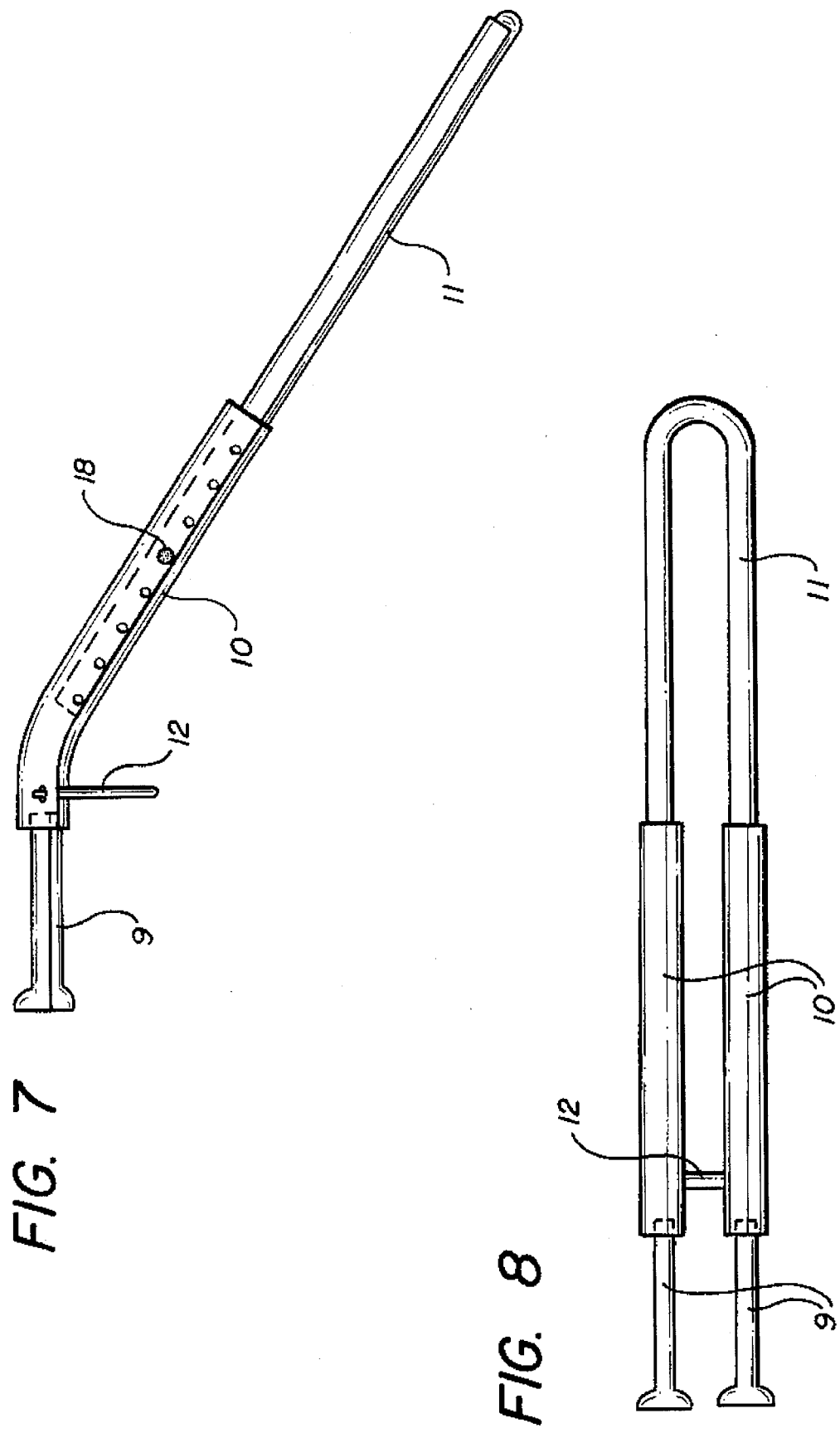

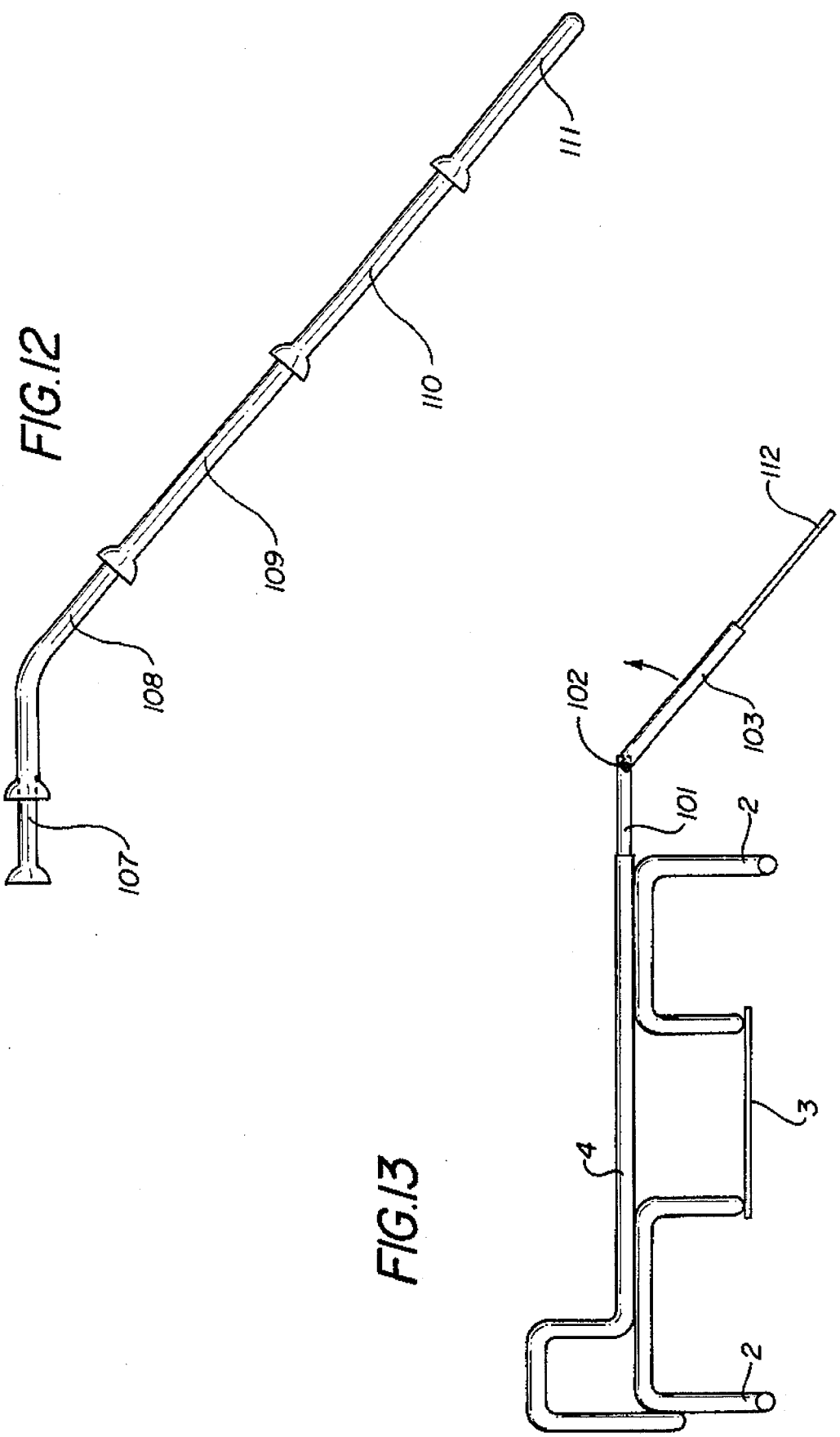

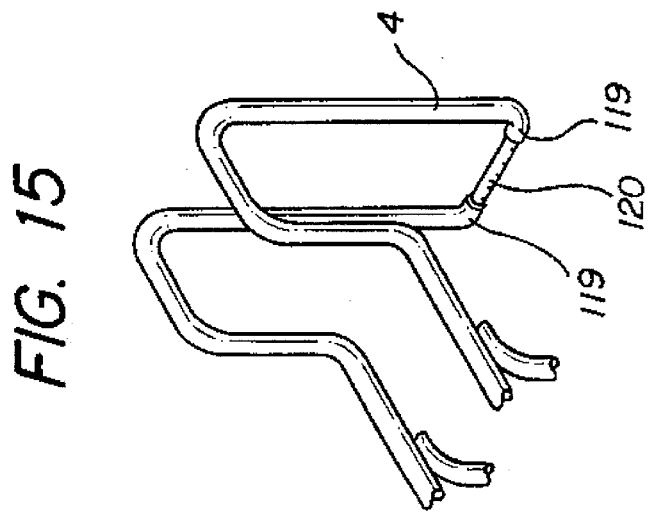
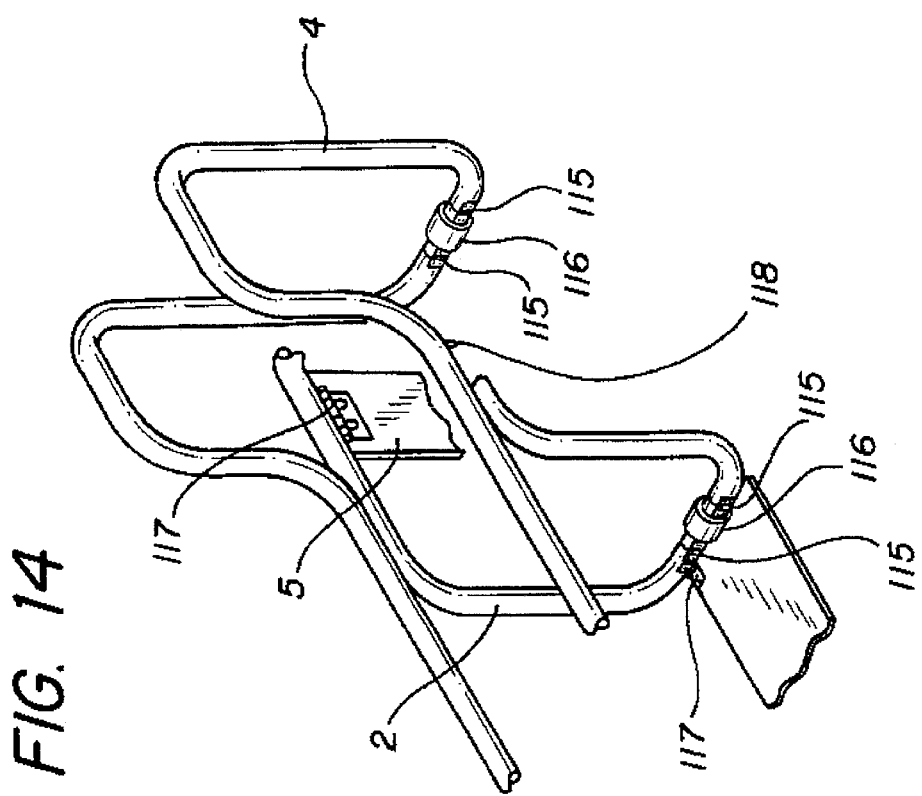

5,542,810

EASILY REMOVABLE DUAL PURPOSE APPARATUS FOR SAFELY TRANSPORTING PERSONAL WATERCRAFT IN TRUCK BED

This application is a continuation of application Ser. No. 08/251,775 filed May 31, 1994, now abandoned.

BACKGROUND—FIELD OF INVENTION

This invention relates to apparatus for transporting personal watercraft to and from recreational areas in a safe and inexpensive manner, and also to storage and repair of said watercraft.

BACKGROUND—DESCRIPTION OF PRIOR ART

Jet Ski's and other personal watercraft are generally transported in trailers. Trailers can fit one or two watercraft and attach to any type of vehicle. Many watercraft owners already have a pickup truck or truck which is able to transport goods in the cargo bed. This invention seeks to supply these owners with a low cost alternative to the trailer.

Using the cargo bed of a truck has the further advantages of not requiring storage of a trailer, not making the truck more difficult to operate (trailers can be awkward to maneuver), and not requiring a hitch attachment.

Many inventions have been created for carrying boats, recreational vehicles and other items on a truck. U.S. Pat. No. 4,212,580 discusses a method for carrying a boat over a pickup truck, and U.S. Pat. No. 3,550,800 discusses a method for carrying a boat in the bed of a pickup. However, none of these address the transport of personal watercraft nor the use of the mechanism for ground transport or storage. Likewise, these patents do not address the safety issues associated with personal watercraft.

Similarly, many inventions have been created for loading and unloading items from a truck bed. For example, U.S. Pat. No. 5,195,767 describes how to use telescoping guide rails. However these patents assist with loading and unloading goods but do not address the specific issues of transporting a watercraft in a safe manner, nor can they be used for ground storage and transportation of the craft.

Another category of inventions which pertains to the history of this invention are dollys and shop carts which are used for ground transportation of the watercraft in a garage, storage, showroom, dock or repair area. For example, U.S. Pat. No. 3,455,473 describes a boat dolly for transporting boats. These inventions do not address the use of such a dolly for transporting the boat in a truck, nor the peculiar stabilization and safety issues associated with a truck bed.

Inventions for transporting a watercraft in a truck bed have been developed but lack the features which make an integrated rack easily removable and useful in a second role as a dolly or shop cart. Generally, these inventions have not included the unique safety features envisioned by this invention. For example, U.S. Pat. No. 5,249,910 does show a truck rack which can easily load a watercraft. However, the rack is not designed to be removable, and therefore is not designed for dual use as a watercraft cart. Also, the design uses the traditional tongue barrier to prevent the watercraft from moving forward when stowed in the truck bed. This patent will show a redundant barrier system which has a higher safety factor in collision scenarios. Other examples of such patents include U.S. Pat. No. 4,960,356 and U.S. Pat. No. 5,257,728. Neither of these is easily removable (both bolt to the truck bed), and neither has a dual use as a cart. U.S. Pat. No. 5,005,846 envisions a transporter carriage used to load and unload various supporting structures. However the invention does not include an integrated unit with accompanying safety features, nor does it include features which would make it useful as a shop rack.

OBJECTS AND ADVANTAGES

The invention described herein provides the combination of features from previous inventions with a set of newly invented features. The previous inventions include rail assemblies and integrated rack assemblies with low friction surfaces for easily loading and transporting goods of all varieties. The new features of this invention include:

(a) An integrated rack which can be easily installed in a truck bed or removed from a truck bed without the use of bolts, pins, or other hardened fasteners, yet which is quickly loaded and unloaded with a watercraft (via ramps and a winch). Therefore, this rack requires no modification of the flat cargo area of the truck (bed). This is made possible through the use of rigid attached elements which act as horizontal and rotational stabilizers at each corner of the rack (and a redundant system of commercially available tie-downs to ensure safety).

(b) Shelf, handles, and vertical elevation to facilitate the use of the rack as a storage device, sand rack, or rolling shop dolly (by adding stem casters or wheels to the stabilizers).

(c) Safety devices such as the redundant barrier attachments between the watercraft and the cab of the truck. This becomes particularly important when the watercraft rides above the truck bed and directly behind the rear cab window. Other safety devices include the use of stabilizing and rear tie downs to backup the horizontal stabilizers, and allowing the tailgate to be closed where required.

(d) Horizontally extensible rail mechanism and ability to carry ski above truck bed accomodates rear barrier to keep watercraft in truck bed.

(e) Lack of horizontal cross members between rails allows deep hulled watercraft or watercraft with modified bottoms (for example addition of after-market scoops) to be transported.

Further objects and advantages of my invention will become aparent from a consideration of the drawings and ensuing description.

DRAWING FIGURES

The preferred embodiment of this invention is shown in FIGS. 1 through 9. Alternative embodiments for the rail system are shown in FIGS. 10 through 13. Alternative embodiments for the rack are shown in FIGS. 14, 15, and 18. FIGS. 16 and 17 show alternative barrier designs.

FIG. 7 shows a side view assembly drawing for the ramp rails.

FIG. 8 shows a plan view of the ramp rail assembly.

FIG. 12 shows an alternative to telescoping ramp rails which uses expanded tube ends to lock pieces of the ramp together. Pieces of all sizes could be supplied to adapt to any launch site.

FIG. 13 shows an alternative ramp which completely telescopes into the rack for easy storage.

FIG. 14 shows an alternative of the preferred rack which includes hinges on each cross member so the rack can be flattened for storage.

FIG. 15 show another alternative to the preferred rack which includes telescoping pieces for each cross member so the rack can be reduced for easy storage.

REFERENCE NUMERALS IN DRAWINGS

| | |
|---|---|
| 2 Leg | 19 Casters |
| 3 Shelf | 20 Shop tools |
| 4 Rack Rails and barrier | 101 Horizontal hinged pieces |
| 5 Winch plate | 102 Hinge pin |
| 6 Winch | 103 Sloped hinge piece |
| 7 Tie Down Straps | 104 Upper rail |
| 8 Clamping Tail Ring | 105 Lower rail |
| 9 Slip-on rail extensions | 106 Hinge |
| 10 Ramp rail elbows | 107 Twelve inch detachable piece |
| 11 Ramp rail end piece | 108 Detachable bent piece |
| 12 Winch cable guide | 109 Eighteen inch detachable piece |
| 13 Winch cable | 110 Twenty four inch detachable piece |
| 14 Extended winch handle | 111 Twenty inch detachable piece |
| 15 Shoulder Bolts | 112 Bottom telescoping ramp piece |
| 16 Eye bolts on rail | 115 Tube Hinge |
| 17 Screws | 116 Tube locking collar |
| 18 Ramp pins | 117 Plate Hinge |
| 100 Watercraft | 118 Lock Pin for plate |
| 125 Alternative rail support | 119 Telescoping pin |
| 126 Horizontal stabilizer | 120 Telescoping cross bar |
| 127 Nose barrier | 130 Metal plate barrier |
| 128 Barrier brace | 131 Metal plate mounting bolts |
| 129 Leg bar | 132 Alternative rack rail and barrier |
| 135 Watercraft nose ring | 133 Alternative leg |

Description of FIGS. 1 through 18

Figure 1:
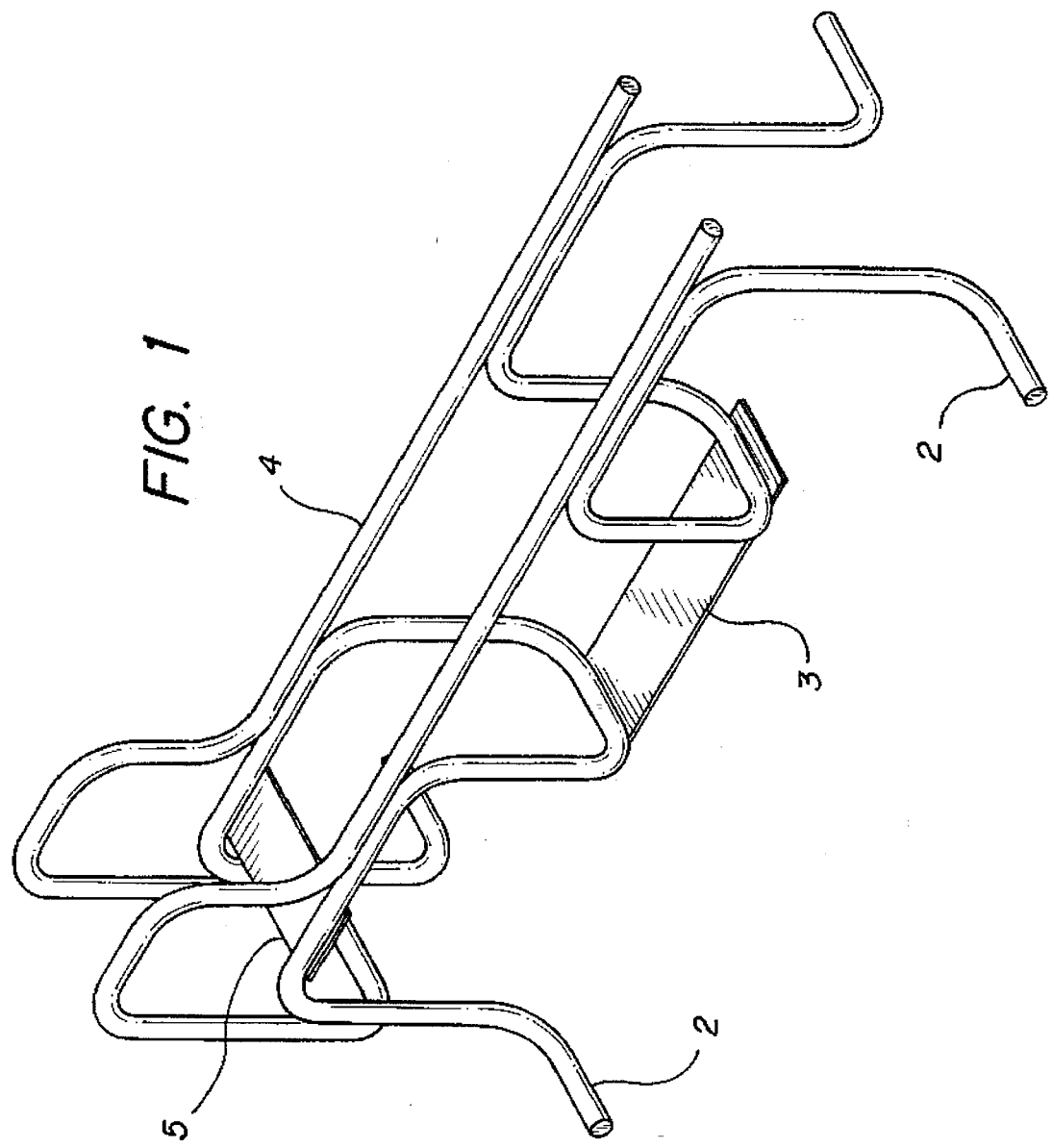
FIG. 1 shows the basic rack assembly without the winch or accompanying rails.
Figure 2:
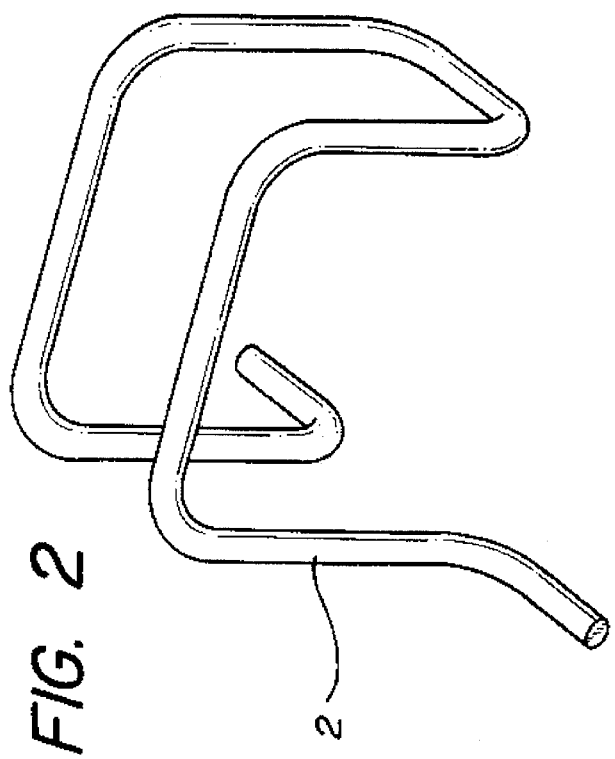
FIG. 2 shows the leg assemblies which provide horizontal stabilizers, vertical support, and shelf support.
Figure 3:
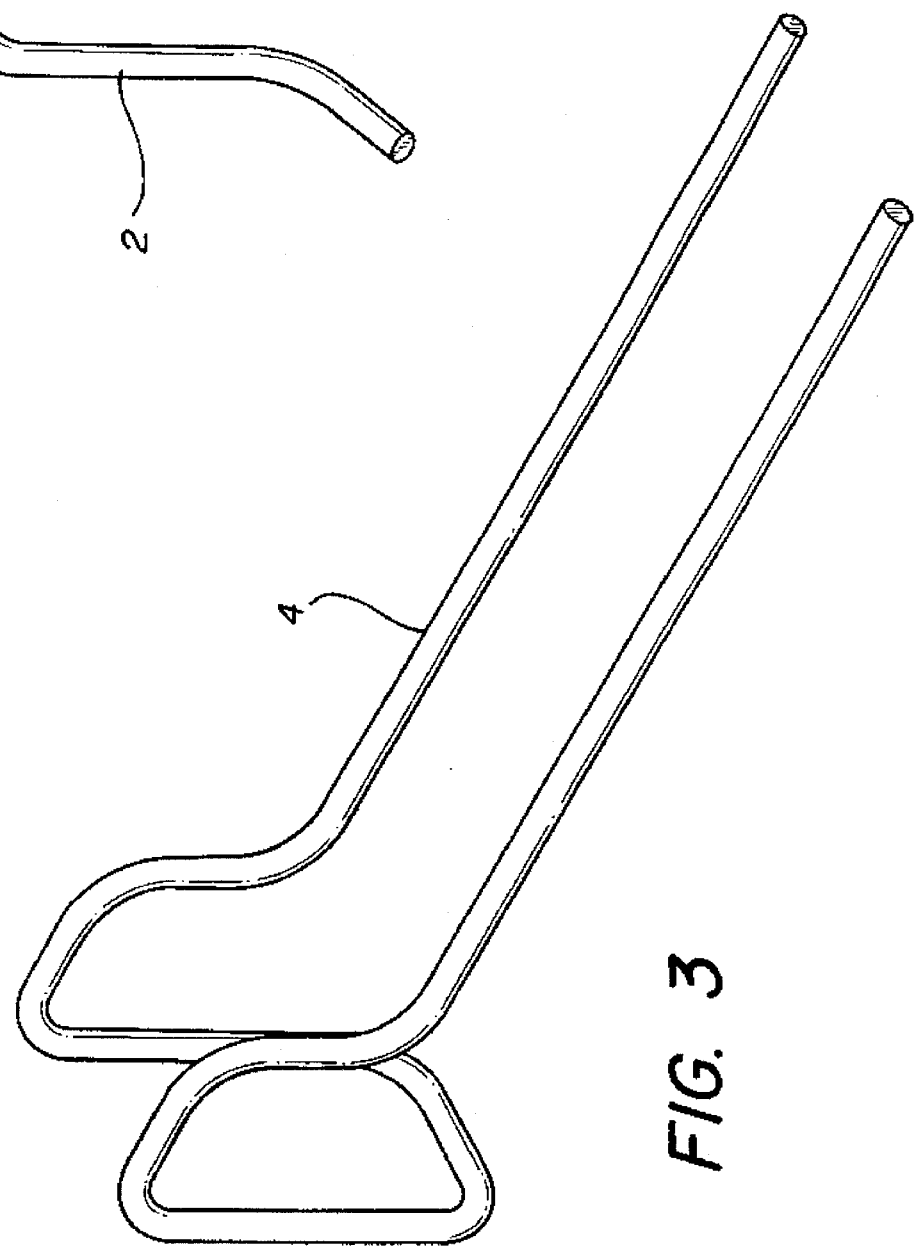
FIG. 3 shows the rack rails and the elevated barrier (which has a rear vertical part for bracing against the truck bed).

The preferred embodiment of the basic rack is shown in FIG. 1. The three main pieces are the top rail and barrier piece 4 and two identical leg pieces 2. Each of these pieces are shown in more detail in FIGS. 2 and 3. The pieces consist of ordinary carbon steel tube (1½ inch outside diameter was used for this embodiment), with ninety degree bends formed with a hydraulic bender. Benders are generally available through machine exchanges. Alternative materials such as other metals, plastic or carbon fiber parts would also be acceptable materials for these pieces. Strips of low friction material such as plastic or carpet are later added to the top rails to provide an easy slip surface for the watercraft. FIG. 1 also shows two pieces of steel plate which provide a shelf for the rack 3 and a winch plate 5. Likewise the material for these plates could be plastic or another suitable material.

Figure 4:
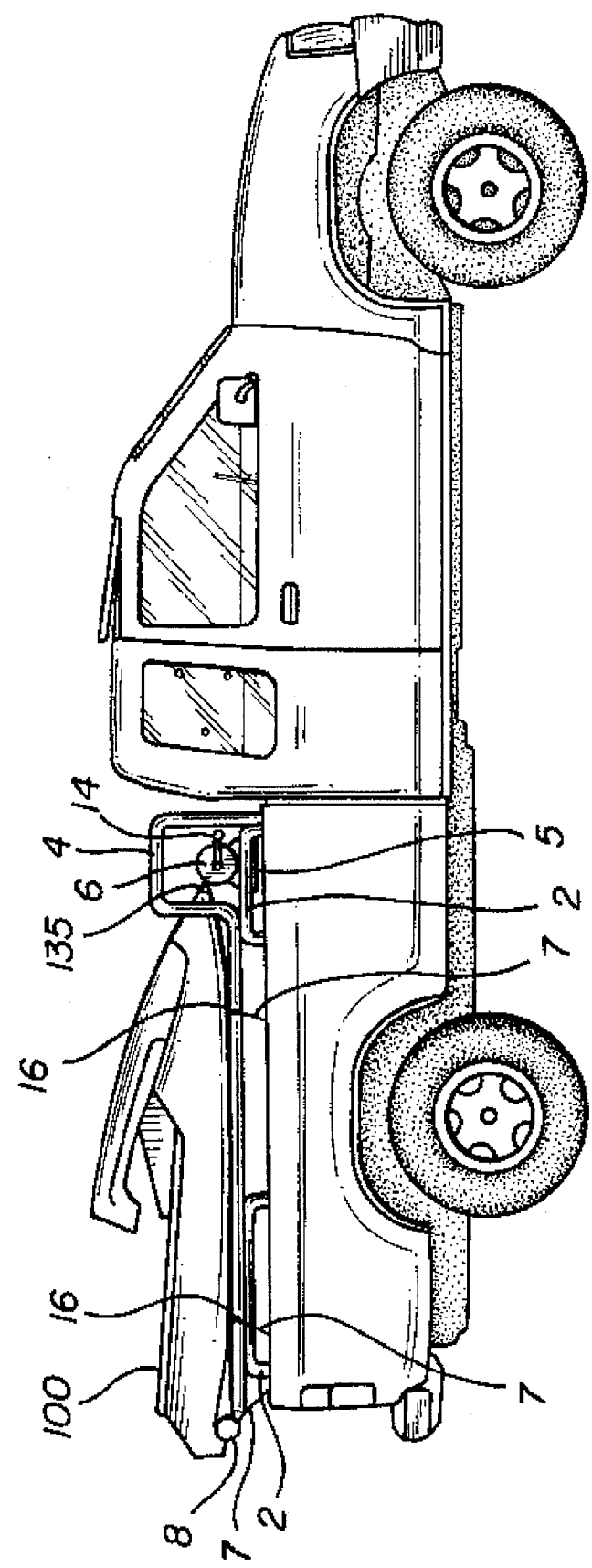
FIG. 4 shows the rack installed in the bed of a pickup truck, and loaded with a watercraft.
Figure 5:
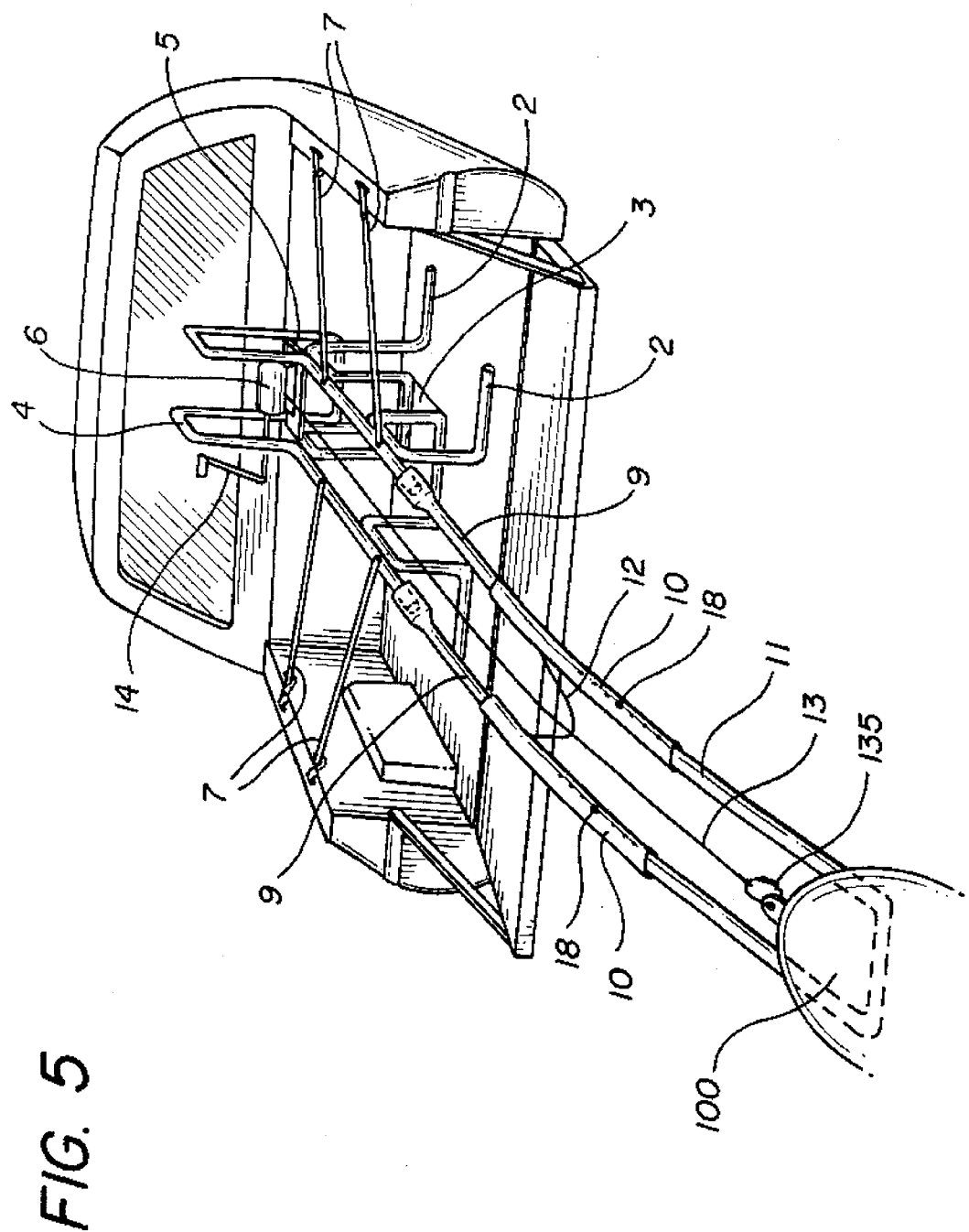
FIG. 5 shows a rear view of the rack installed in the bed of a pickup truck, and in the process of loading a watercraft.

FIG. 4 shows the fully assembled rack installed in a pickup truck and loaded with a watercraft. A winch 6 has been mounted on a winch plate 5 during assembly of the rack which is further discussed in FIG. 6. Installation of the rack in the pickup consisted of setting the rack in the truck bed and then connecting commercially available tie downs 7 between the four eye bolts 16 and the bed hooks or post holes found in all pickup truck beds. No modification of the bed was required even if a bedliner was present. The watercraft was loaded by slidably attaching the ramp (which is shown in more detail in FIGS. 7 and 8) to the rack and then pulling the winch cable to the front of the watercraft. The nose ring 135 is attached to the watercraft, and then winched up the ramp onto the rack. The ramp is removed and the clamping tail ring 8 is attached to a tie down to prevent the rear of the craft from moving relative to the rack. FIG. 5 shows the rack installed in the truck bed prior to being loaded with the watercraft. The rail has been adjusted to the slope of the ramp using pins 18 and evenly spaced holes in the telescoping rail elbows 10. The ramp has also been extended using slip on extension pieces 9 which are expanded at one end to lock onto the rack rails. This expanding is accomplished with a swaging machine for steel tubes. Likewise, extensions and rails could be extruded plastic pieces.

Figure 6:
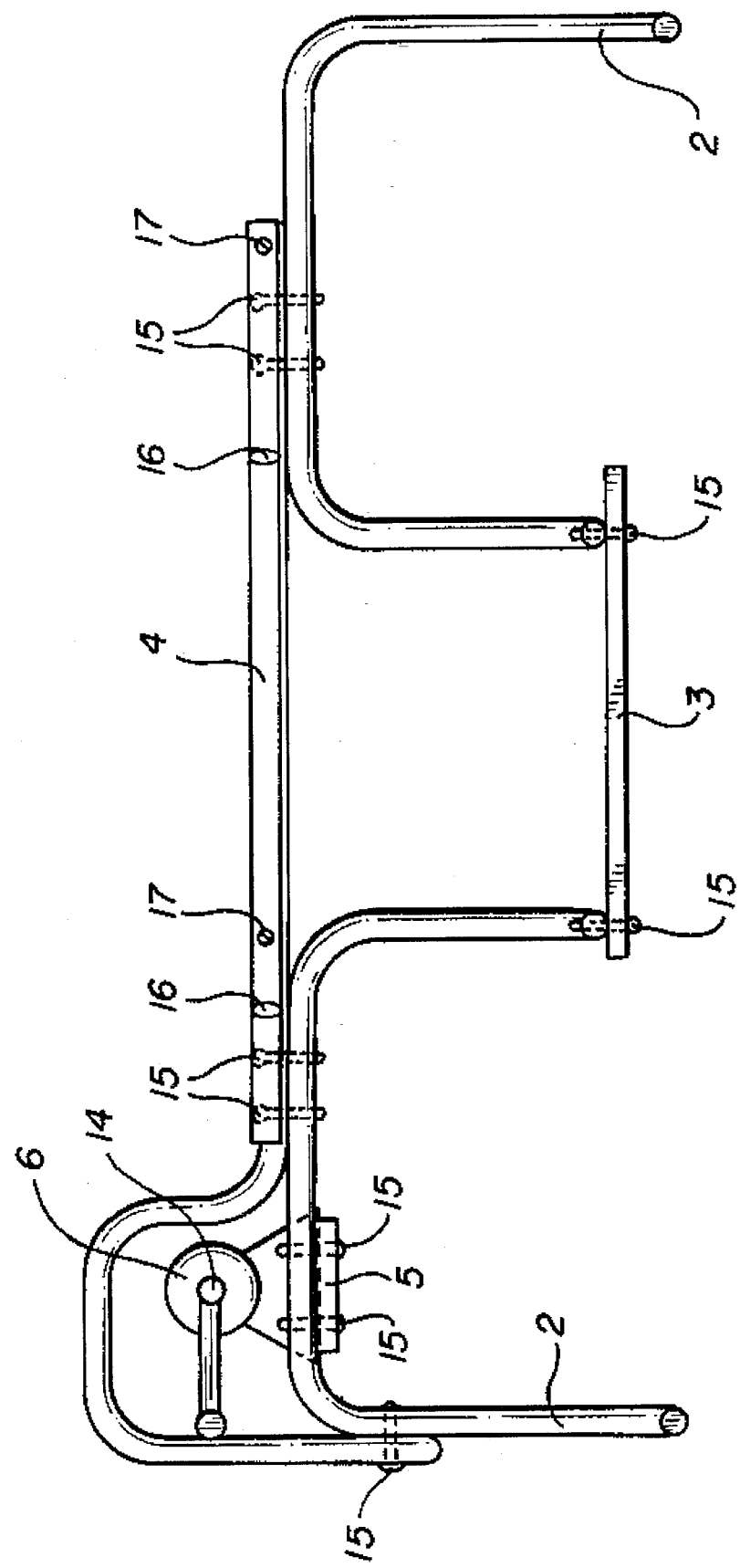
FIG. 6 shows an assembly drawing for the preferred embodiment of the rack including fasteners.

FIG. 6 shows an assembly drawing for the basic rack. Assembly is accomplished by attaching the rack rail and barrier piece 4 to the two identical leg pieces 2. This is done using redundant shoulder bolts 15. Likewise the winch plate 5 and shelf plate 3 are attached using four shoulder bolts each. Finally the winch 6 and extended handle 14 are mounted on the winch plate 5 by bolting them together. Eye bolts 16 are inserted in the sides of the top rail to provide anchor points for the tie downs. The screws 17 are shown for holding the low friction pieces in place (in this case strip of low density polyethylene were used-which were cut from sheets of polyethylene available at commercial plastic providers).

FIGS. 7 and 8 show assembly of the ramp pieces. FIG. 7 shows a side view where two extension pieces 9 with expanded ends and a low friction covering are slid into two larger pieces of tubing 10 which are bent to a 45 degree angle and also have a low friction covering. Again steel tubing was used for each piece in this example with pieces 9 and 11 being 1½ inch outside diameter, and pieces 10 being 2 inch outside diameter. Equidistant holes are drilled in the two bent pieces 10 to allow the ramp length to be adjusted. Two pins 18 are used to hold the ramp at the appropriate length. Piece 11 is bent into a U shape, and has one hole at the top on each side to allow the pin to be inserted. Piece 11 also has a low friction top piece attached. Again the bending is accomplished with a commercially available steel tube bender. FIG. 8 shows a plan view of the ramp which includes piece 12 which is a V shaped piece. The preferred embodiment uses ¼ inch steel rod bent into the appropriate shape and threaded on both ends. The ends are then inserted through diagonal holes in the two bent pieces 10 and nuts attached. This piece serves to guide the winch cable.

Figure 9:
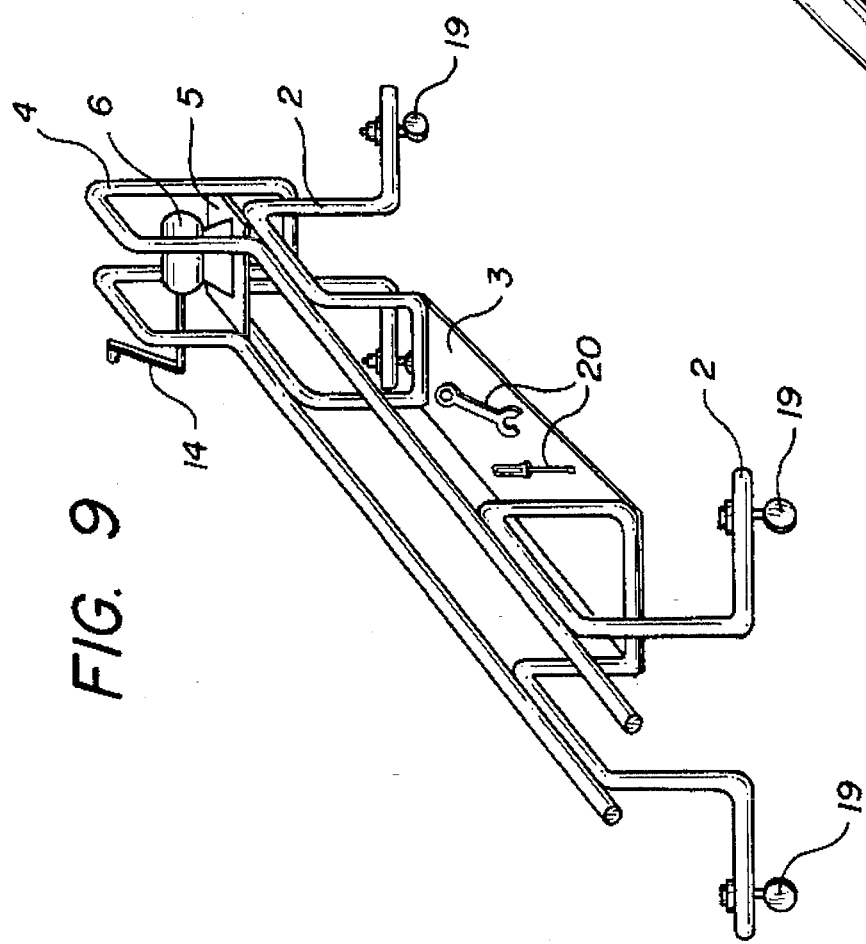
FIG. 9 shows the rack configured with stem casters for use in a garage, shop, or showroom environment.

FIG. 9 shows the rack with stem casters 19 attached through two holes in each leg piece 2. This configuration can serve as a shop, garage or showroom rack. Tools 20 are shown resting on the shelf to note the utility of having a shelf for parts, tools, or other artifacts. Without the stem casters 19 the rack can serve as a dry storage rack, or a sand rack.

Figure 10:
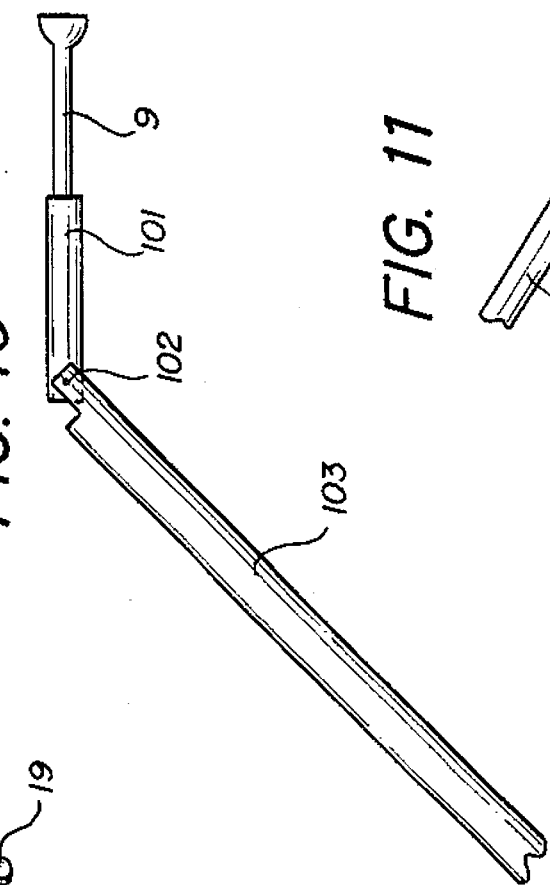
FIG. 10 shows an alternative embodiment for the ramp rails which includes a hinged elbow.
Figure 11:
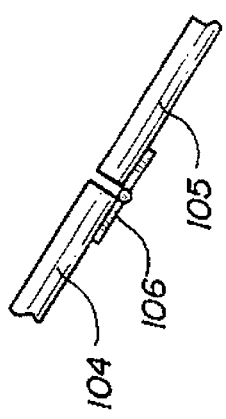
FIG. 11 shows an alternative to solid pieces for the long parts of the ramp (for example the bottom of the ramp).

FIGS. 10, 11, 12 and 13 show alternative embodiments of the ramp. In FIG. 10 a horizontal piece 101 and vertical piece 103 are attached using a hinge pin 102 and a notch in piece 103. This would replace the bent pieces 10 in the preferred embodiment. FIG. 11 shows a ramp embodiment where an upper rail piece 104 is connected with a lower rail piece 105 via hinge 106. This could be used to replace any load bearing rail piece on the preferred embodiment ramp such as piece 11. FIG. 12 shows another embodiment of the ramp where independent pieces of varying lengths 107, 108, 109, 110, 111 are connected to form the ramp. A set of many pieces with different lengths would be provided to allow numerous ramp configurations. Again each piece has one end expanded to allow the pieces to slip together. FIG. 13 shows a configuration where the entire ramp can telescope into the rack. This is accomplished by designing the diameter of pieces 101, 103 and 112 small enough to telescope into one another. This embodiment uses a hinge pin 102 for the ramp joint.

FIG. 14 and 15 show embodiments which allow the rack to be collapsed for easy storage. In FIG. 14 hinges 115 are added to each cross member of the preferred embodiment to allow the piece to collapse. Collar 116 is used to slide on the joint in the cross members when the rack is configured for use. Plate hinges 117 are used to allow the plates to drop to a vertical alignment. When reconfigured lock pins 118 are used to hold the plates horizontal. Similarly, FIG. 15 shows a telescoping mechanism for allowing the preferred embodiment to collapse for storage. In this embodiment a smaller diameter tube 120 is used for crossing members and can be adjusted using pins 19 for any rack width.

Figure 17:
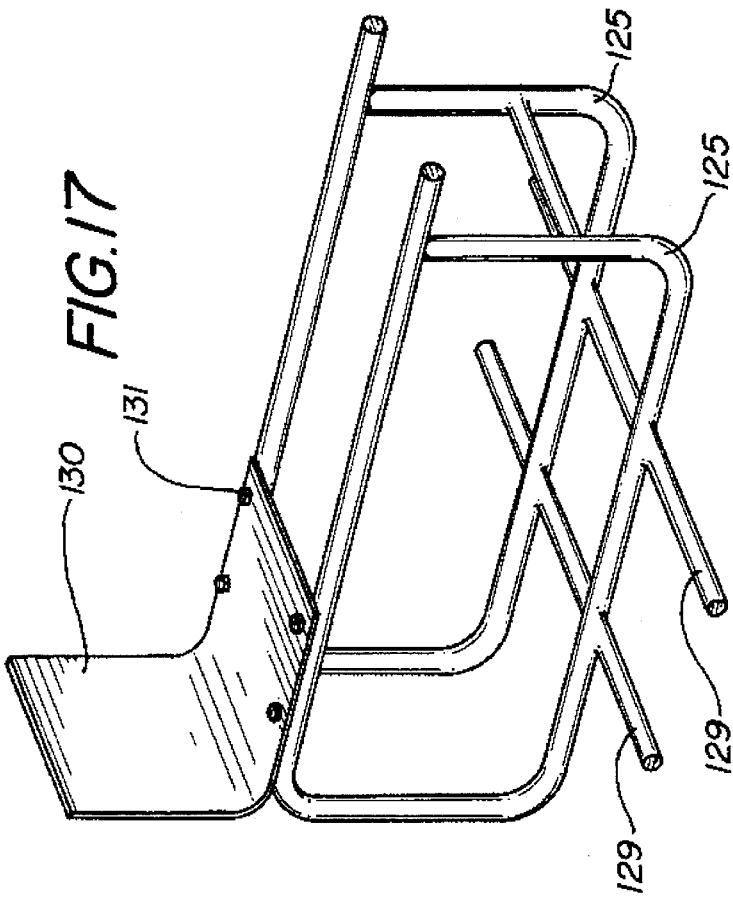
FIG. 17 shows an alternative barrier which includes a bent metal plate with multiple attach points on the rack.
Figure 16:
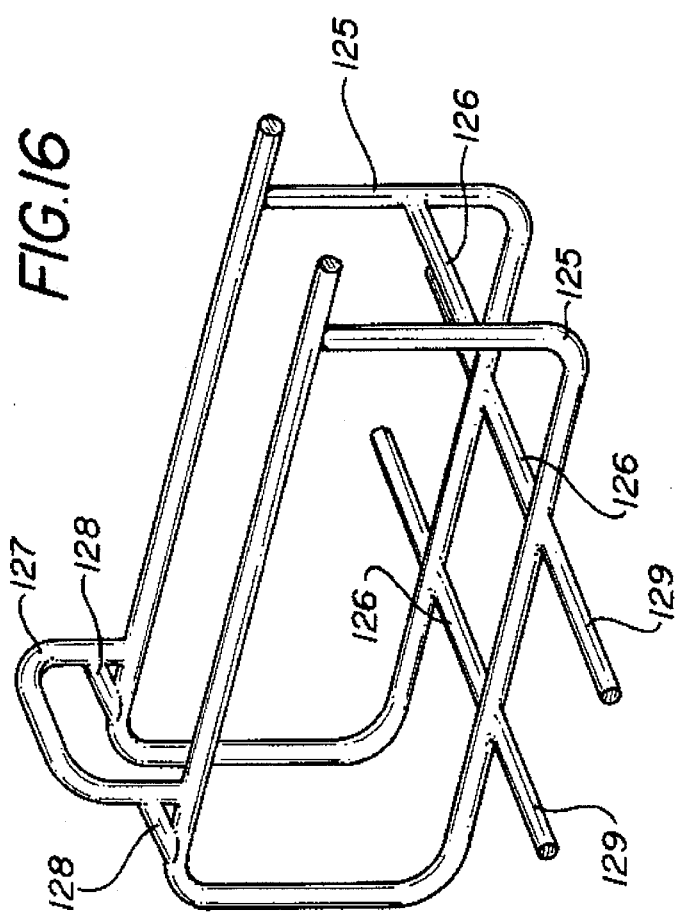
FIG. 16 shows an alternative barrier design for the rack which includes an enclosing nose piece and braces.

FIGS. 16 and 17 show alternative barrier designs. FIG. 16 depicts a nose barrier 127 which encloses the top and sides of the nose of the watercraft. The barrier in this case is supported by braces 128. In FIG. 17 a piece of plate metal 130 is bent into an L shape to provide a barrier for the watercraft. The plate 130 would be designed to have a greater vertical length than the truck bed window. Mounting bolts 131 are used to attach the plate.

Figure 18:
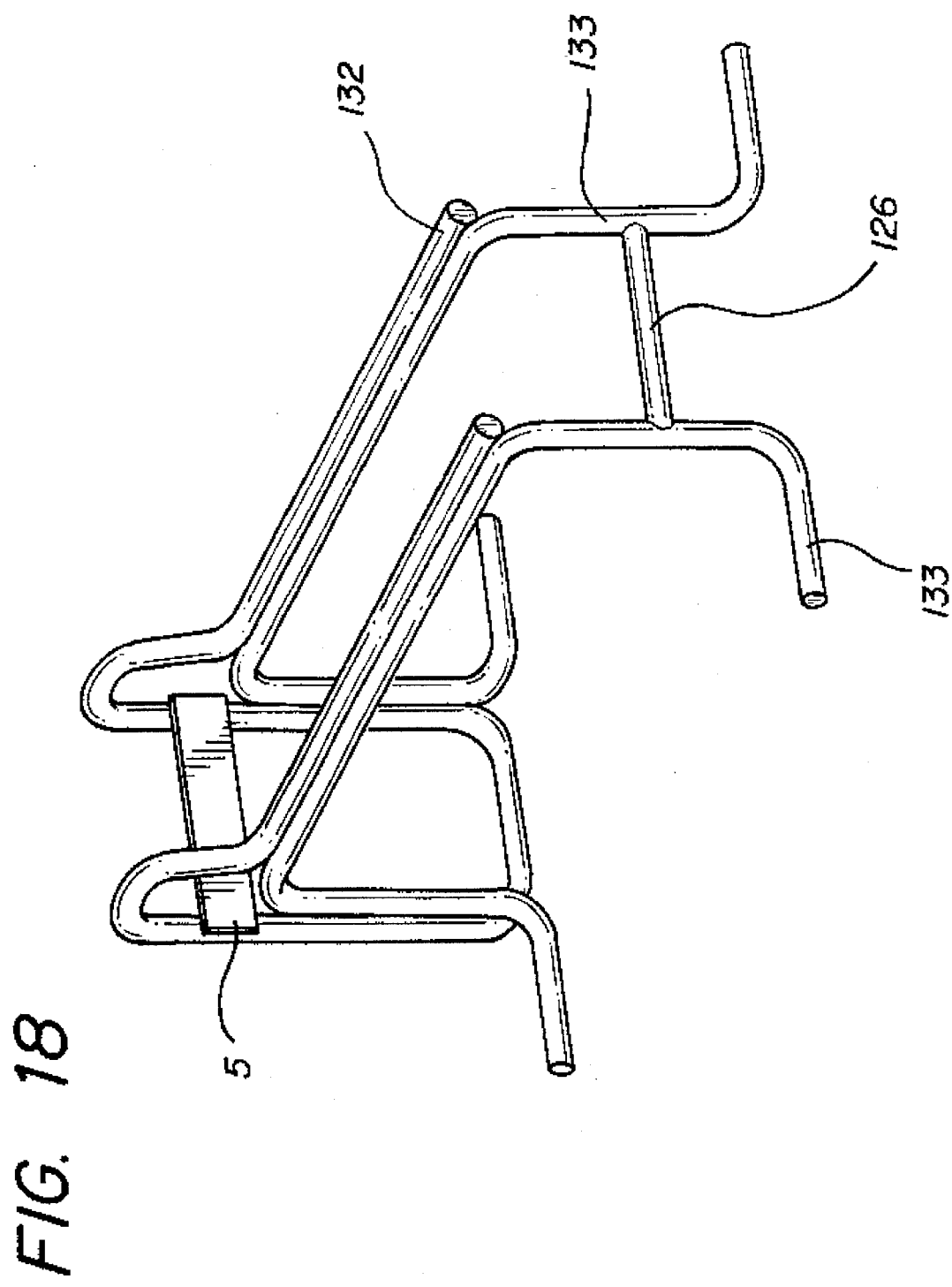
FIG. 18 shows an alternative design of the vertical and winch supports for the main rack (winch, shelf, and rails not shown).

FIG. 16 and 18 show alternative vertical support designs. FIG. 16 shows two tubes bent into an oval 125 which act as rail supports. In this design crossing members 126 are used to give the rack horizontal stability. Two rigid rods 129 are then attached to the bottom of the rack to serve as horizontal and rotational stabilizers. In FIG. 18 an alternative rack is shown. This rack features an alternative rack rail and barrier piece 132 with a longer brace against the rear of the truck cab. The leg pieces 133 are also different and provide vertical support but require a brace 126 which is welded or bolted to the legs for horizontal stability.

From the descriptions above a number of advantages for the preferred embodiment become evident:

(a) The rack is quickly installed in the truck bed by simply setting it in the bed and attaching four tie downs to the eye bolts (with S hooks at the end of commercially available tie downs).

(b) The watercraft is quickly and easily loaded on the rack using ramps which adjust to the slope of the ramp or surface where the watercraft rests. Ramps have suitable low friction material, and the rack includes a winch for hoisting the watercraft up the ramp.

(c) The rack is one integrated piece, constructed by bolting or welding together a number of bent steel tube or similar material.

(d) The rack includes a shelf for use as a shop or garage dolly. Casters or wheels can be attached for easy movement in the work area. The design of the barrier in the preferred embodiment gives it a dual use as a set of handles. The integrated unit holds the watercraft off the ground far enough to afford comfortable use as a rack.

(e) The rack includes two bent steel tubes as barriers, and a long vertical piece which braces it against the rear of the cab. Tie downs are used for horizontal stability in addition to the stabilizers on the rack itself. The rack can be used with the tailgate in the closed position for safe transport of other goods in the bed of the truck. The rear of the watercraft is also attached via tie-down to prevent separation of the watercraft from the rack.

(f) Design accomodates deep hull or modified watercraft by not placing cross members between rails

Operation—FIGS. 4, 5 and 9

Ease of operational use is a paramount goal of this design. Installation of the unit in the truck bed is accomplished by simply setting the rack in the truck, and attaching four tie downs 7 to the post holes or tie down rings supplied with all pickup trucks. The unit requires no modification of the truck. Installation should take less than a minute.

Loading and unloading the watercraft is likewise a straight forward operation. The ramp may be disassembled for storage or stored as one assembled piece. The ramp is attached to the rack by simply slipping it onto the end of the rack rails 4. The ramp is then adjusted to the slope of the launching area using the ramp pins 18. The winch cable is now run across the cable guide 12 and attached to the nose of the watercraft with the clamping nose ring 135 as shown in FIG. 5. The watercraft is then hoisted into the truck by the winch 6. The ramp is slidably removed from the rack and stored in the truck bed or a storage location (where it may also be disassembled). Finally, the rear of the watercraft is tied down via the clamping tail ring 8 and the tailgate is closed in most cases.

Use as a storage rack or sand rack simply requires setting the rack in the desired location and loading the craft via ramps (or by otherwise lifting). Use of the rack as a shop, garage, or showroom dolly involves placing stem casters 19 on the rack shown in FIG. 9 and loading the watercraft on the rack via ramps (or by otherwise lifting).

SUMMARY, RAMIFICATIONS, AND SCOPE

Accordingly, the reader will note that the disclosed invention provides an apparatus for transporting a watercraft to and from recreational areas with relative ease. The invention includes a ramp assembly and winch which make it easy to load and unload the rack. The ramp assembly can be adapted for any launch site.

The subject rack requires no modification of the truck's flat cargo area (bed), and can be installed in less than a minute using widely available tie down straps. No bolts, pins, or other hardened fasteners are used to attach the unit to the truck. The rack is an easily manufactured assembly which is moved as an integrated unit.

The rack has multiple purposes, and can be used as a stationary or rolling dolly. A shelf and handle (dual use of the truck barrier) are provided with the rack.

The rack has a number of safety advantages including a redundant barrier between the watercraft and the truck cab, redundant horizontal and rotational stabilizers to prevent the rack from tipping while the truck is cornering, front and rear attachments to secure the watercraft to the cart, and the ability to close the tailgate (when desired) to secure other cargo and provide a front and rear barrier preventing the rack from leaving the vehicle.

The rack has no horizontal cross members between rails and can therefore accomodate deep hulled or modified watercraft.

Although the specification above contains many specificities, these should not be construed as limiting the scope of the invention but as merely providing illustrations of some of the presently preferred embodiments of this invention. For example, the vertical supports might be oval or straight bars welded together. Likewise, horizontal stabilizers might be straight rods or telescoping parts. Barriers could be two, three, or more pieces in front of the watercraft, etc.

Thus the scope of the invention should be determined by the appended claims and their legal equivalents, rather than by the examples given.

I claim:

1. An apparatus for transporting personal watercraft in truck beds or across hard surfaces comprising:

(a) a base means for supporting said personal watercraft, said base means comprising a plurality of main supporting members having vertical portions and longitudinally extending horizontal portions located at a top of said vertical portions, at least one transversely extending horizontal rotationally stabilizing member fixed to a bottom of said main supporting members, and two longitudinally extending personal watercraft supporting members attached to said longitudinally extending horizontal portions of said main supporting members;

(b) a plurality of vertical members attached to a top of said vertical portions of said main supporting members at one end of said longitudinally extending personal watercraft supporting member, at least two of which are separated by a distance less than a width of said personal watercraft, have a length greater than a draft of said personal watercraft, and which from a barrier for horizontal translation of said personal watercraft;

(c) means for attaching casters at the bottom of said vertical portions of said main supporting members;

(d) a winch attached to said main supporting members;

(e) a set of rigid rail means for slidably loading and unloading said personal watercraft, said rigid rail means attached to said longitudinally extending personal watercraft supporting members; and (f) means for attaching flexible lateral, longitudinal, and vertical stabilizers to said longitudinally extending personal watercraft supporting members.

2. The apparatus of claim 1, further including a shelf attached to said main supporting members.

3. The apparatus of claim 1, wherein said set of rigid rail means includes a bent bottom rail telescoped into said longitudinally extending personal watercraft supporting members.

4. The apparatus of claim 1, further including hinge means attached to said main supporting members for collapsing said base means.

* * * * *